UNITED STATES PATENT OFFICE.

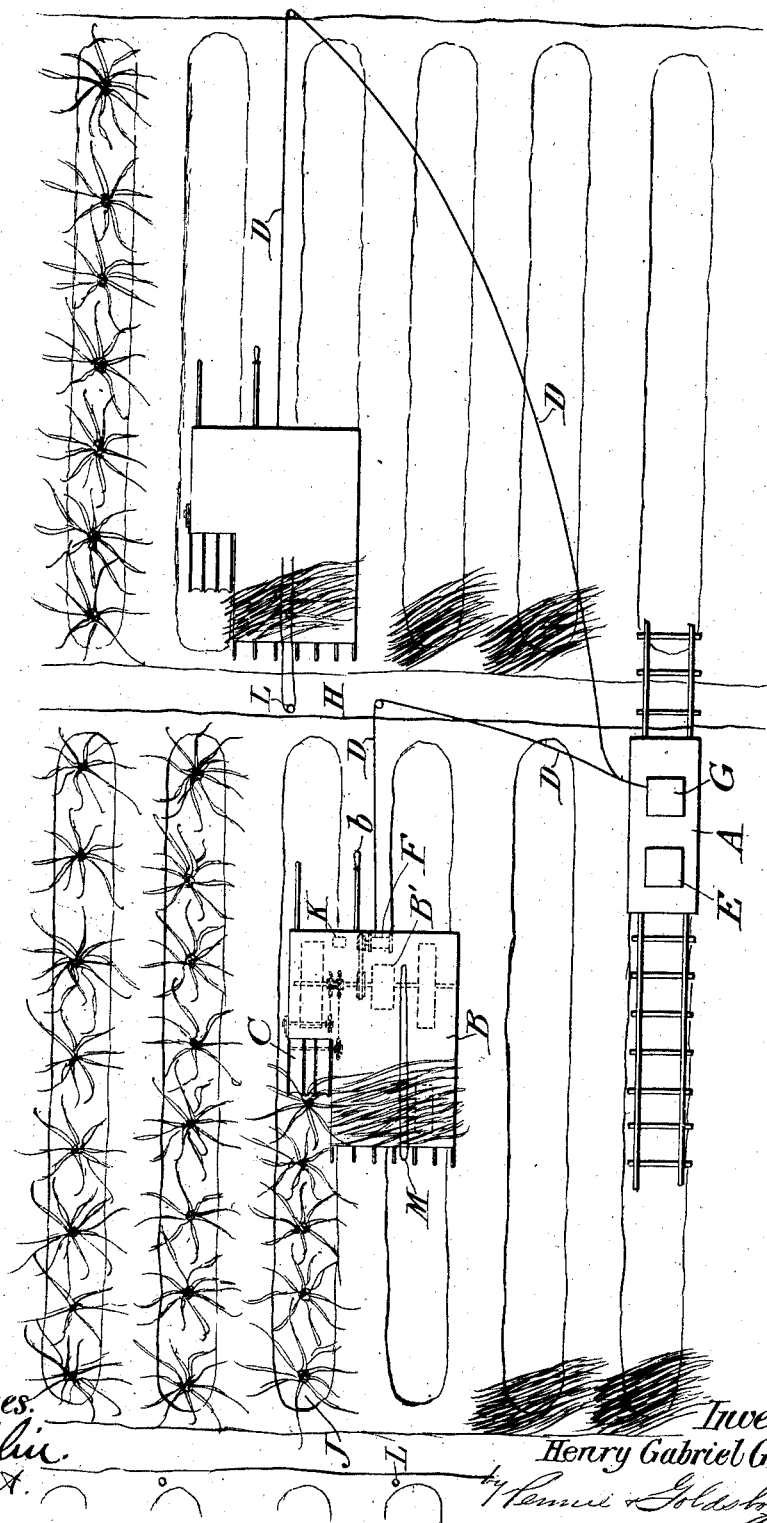

HENRY GABRIEL GINACA, OF HONOLULU, TERRITORY OF HAWAII, ASSIGNOR, BY DIRECT AND MESNE ASSIGNMENTS, OF TWO-FIFTHS TO ABRAHAM GARTENBERG, OF HONOLULU, TERRITORY OF HAWAII.

HARVESTING SUGAR-CANE.

No. 883,537. Specification of Letters Patent. Patented March 31, 1908.

Application filed September 16, 1905. Serial No. 278,771.

*To all whom it may concern:*

Be it known that I, HENRY GABRIEL GINACA, a citizen of the United States, residing at Honolulu, county of Oahu, Territory of Hawaii, have invented new and useful Improvements in Harvesting Sugar-Cane, of which the following is a specification.

This invention relates to an improved method of harvesting sugar cane.

The object of this invention is in the nature of improvements on the apparatus for harvesting sugar cane for which Letters Patent No. 798,033, were granted to me on August 22, 1905. By my present invention, the hauling cables with their necessary drums, field anchors, etc. are eliminated, the portable power plant does not have to be moved after the cutting of each row and may be employed for operating a plurality of cutting and conveying machines, and other advantages are obtained as will hereinafter appear.

With these objects in view my invention consists in the arrangement and combination of parts and apparatus, as hereinafter fully described and claimed, reference being had to the accompanying drawing representing in plan a portion of a cane field and the apparatus I employ. As the machine hereinafter mentioned for conveying sugar cane with cutting devices attached is the subject of a separate application for patent a detailed description of the same is now omitted.

The portable power plant A consists preferably of a car adapted to run over the plantation tracks and provided with an engine E and an electric generator G driven thereby. The motor B' of the propelling mechanism of each of the conveying machines B is connected with the generator G of the power plant A by means of suitable electrically insulated flexible cables D. A drum F, attached to the rear of the machine B, pays out or takes up the slack of the cable D, as the case may be depending upon whether the movement of the machine B is forward or backward. Each of the conveying machines B is provided with cutting devices C attached to the machine. These attached cutting devices C may be operated either directly or indirectly by the motor B' of the conveying machine B. Each machine B, with the attached cutting devices C, is under the control of an operator, for by means of the electrical controller K, he can start or stop or vary the speed of the machine at will, and by means of the lever b he can guide or steer the machine.

The machine B is started from an irrigation ditch H, the devices C cutting the cane grown in one row, and most of the cane thus cut is deposited upon the apron of the machine B upon which it is conveyed, a sling M being previously placed upon said apron. The cut cane which falls in front of the machine is picked up as the machine advances. Upon arrival at the irrigation ditch J the machine is stopped, and the sling M is then gathered around the cane upon the apron of the machine B and attached to a temporary stake or anchor L in the field. The machine B is then started backwards towards the ditch H, thereby removing the conveyed cut cane in the sling M from the machine B. The cane thus dumped near the ditch J is topped, stripped and loaded onto cars to be taken to the mill, this being accomplished either by hand or by machines suitable therefor. Upon the return of the machine B to the ditch H it is then started on the next adjoining row of cane, and these operations are repeated. In the mean time other machines B, with cutting attachments C, are operating in a similar manner in other portions of the field adjacent to the power plant A. The portable power plant A is moved from time to time when necessary to follow up with the machines B as the field becomes cleared.

If electric power is obtainable throughout the field to be harvested, from the mill or elsewhere, the power plant A is omitted and the cables D are attached to the feeders from such supply, or the car of the power plant A may, in lieu of the engine E and generator G, be provided with transformers or a rotary converter as may be necessary to suit the conditions.

Having thus described my invention, what I claim is—

1. An apparatus for harvesting sugar cane, comprising a cane cutting and conveying machine provided with a motor driven mechanism for propelling it over the surface of the field, a railway traversing the field, a power plant carried by said railway, a flexible insulated cable for transmitting the power from the plant to the motor of the propelling mechanism, and a winding drum on the machine to take up or pay out slack in the cable.

2. An apparatus for harvesting sugar cane, comprising a cane cutting and conveying machine provided with a motor driven mechanism for propelling it over the surface of the field, a railway traversing the field, a power plant carried by said railway, a flexible insulated cable for transmitting the power from the plant to the motor of the propelling mechanisms, a winding drum on the machine to take up or pay out slack in the cable, and means for unloading the cane.

3. An apparatus for harvesting sugar-cane, comprising a railway track, a car movable thereon, an engine and electric generator mounted on the car, a cane cutting and conveying machine provided with a motor-driven mechanism for propelling it over the surface of the field, the cutting mechanism being also operated by the motor on the machine, and a flexible insulated cable for transmitting power directly from the generator on the car to the motor on the machine.

In testimony whereof I have signed my name to this specification in the presence of two subscribing witnesses.

HENRY GABRIEL GINACA.

Witnesses:
  A. F. EWART,
  ROBT. J. PRATT.